United States Patent
Shih

(10) Patent No.: US 7,716,515 B2
(45) Date of Patent: May 11, 2010

(54) METHOD FOR UPDATING THE TIMING OF A BASEBOARD MANAGEMENT CONTROLLER

(75) Inventor: Wen-Hsin Shih, Taipei (TW)

(73) Assignee: Inventec Corporation, Taipei (TW)

( * ) Notice: Subject to any disclaimer, the term of this patent is extended or adjusted under 35 U.S.C. 154(b) by 723 days.

(21) Appl. No.: 11/642,639

(22) Filed: Dec. 21, 2006

(65) Prior Publication Data

US 2008/0155244 A1  Jun. 26, 2008

(51) Int. Cl.
G06F 1/00 (2006.01)
G06F 15/177 (2006.01)
G06F 1/12 (2006.01)

(52) U.S. Cl. ............................. 713/500; 713/2; 713/400

(58) Field of Classification Search ...................... 713/2
See application file for complete search history.

(56) References Cited

U.S. PATENT DOCUMENTS 7,197,657 B1 * 3/2007 Tobias ........................ 713/400
7,237,086 B1 * 6/2007 Kothandapani et al. ........ 712/8
7,484,084 B1 * 1/2009 Ranaweera et al. ............ 713/1
7,581,133 B2 * 8/2009 Lambert et al. ............. 713/601
2008/0034239 A1 * 2/2008 Lambert et al. ............. 713/323

* cited by examiner

*Primary Examiner*—Suresh K Suryawanshi
(74) *Attorney, Agent, or Firm*—Bacon & Thomas, PLLC

(57) ABSTRACT

The present invention discloses a method for updating the timing of a baseboard management controller (BMC) applied in a computer system. When a basic input output system (BIOS) installed on a motherboard of the computer system is initialized, the current time for the BMC to receive the BIOS is used for the timing of the BMC, and the BMC will send regular synchronous signals to the motherboard at a predetermined interval thereafter. After the motherboard has received the synchronous signal, the current time of the BIOS is sent to the BMC, and the BMC updates the timing of the BMC by the current time of the BIOS, so that the timing of the BMC will be consistent with the current time of the BIOS, and system administrators no longer need to update the time manually.

5 Claims, 3 Drawing Sheets

METHOD FOR UPDATING THE TIMING OF A BASEBOARD MANAGEMENT CONTROLLER

FIELD OF THE INVENTION

The invention relates to a method for updating timing, and more particularly, to a method for updating the timing of a baseboard management controller in a computer system.

DESCRIPTION OF PRIOR ART

The Intelligent Platform Management Interface; or IPMI, is a hardware management interface specification with open standards, and it is a method particularly used to define embedded management subsystems for the purpose of communication. IPMI information is exchanged via the baseboard management controller (abbreviated as BMC hereafter). Therefore, the management of hardware is achieved via low level methods without the need of the operation system, which is advantageous because such configuration allows the management of out-of-band system servers, and it takes the burden of status data transportation away from the operating system.

When the BMC of a computer system is initialized, the Basic Input/Output System (abbreviated as BIOS hereafter) of the computer system gets the current time from a real-time clock (abbreviated as RTC hereafter) of a motherboard in the computer system during the Power On Self Test process (abbreviated as POST hereafter), and then the current time is sent to the BMC to allow itself to update its own timing according to the current time. Subsequently, the BMC continuously accumulates time by using the clock signal generated in the BMC, in an attempt to synchronize the timing of the BMC with the time of RTC in the motherboard. However, such method leads to the following problems:

First of all, the BMC starts its timing in accordance with the clock signal in the BMC after getting an initial time, but since the clock signal of the BMC can vary from the clock signal of the RTC in motherboard, it could lead differences between the timing of the BMC and the current time of the motherboard. Moreover, such a difference increases with time, thus making the difference between the timing and the current time ever greater, and consequently affecting the accuracy of the time events are recorded.

Second, the BMC is equipped with the function of time regulation, which regulates the timing of the BMC after a period of time, in an attempt to synchronize the timing of the BMC with the current time. However, the value used to regulate timing is set by the manufacturer's engineers after conducting statistical analyses, which does not necessarily apply to the usage and working environment of general users. In addition, since the timing could be either greater than or less than the current time, so if the BMC is configured to regulate the timing by subtracting time from it, and keeps on subtracting more time from the timing even when it is actually less than the current time, the timing of the BMC would only become more and more inaccurate.

Thirdly, some manufacturers have tried to manage the timing of the BMC by using SMS (System Management Software) under the operating system, but because different versions of SMS are utilized in motherboards designed by different manufacturers or with different operating systems, it is difficult to create a universal SMS program. More importantly, the use of SMS to configure the timing does not guarantee that errors in synchronization can be prevented.

Fourthly, the use of SMS to manage the timing may not be practical due to the fact that not every user would spend more money beyond their budget on purchasing a SMS; or the fact that the user already has SMS, but cannot update the timing of the BMC simultaneously.

Therefore, the most urgent issue now is to propose a method for updating the timing of the BMC that effectively deals with the aforesaid problems.

SUMMARY OF THE INVENTION

In light of the problems mentioned above, a method for updating the timing of a BMC has been disclosed in this invention, which allows the BMC to have accurate timing.

A primary objective of the invention is to provide a method for updating the timing of a BMC, which is applied to a computer system; comprising: a management unit in a motherboard of the computer system transmits a current time from a RTC in the motherboard to a BMC in the motherboard, so that the timing of the BMC is updated according to the current time; subsequently, the BMC sends out a synchronous signal to the management unit at regular intervals, and when the management unit receives the synchronous signal, the current time provided by the RTC is transmitted to the BMC, which is again used to update the timing of the BMC. Therefore, the timing of the BMC is identical to the current time of the motherboard, which achieves the aim of maintaining the timing of the BMC accurately.

Another objective of the invention is to provide a method for updating the timing of a BMC, which updates the timing of the BMC according to the synchronous signal after a regular interval in the computer system, thereby realizing the goal of allowing computer systems to be updated without the need of manual updating from system administrators.

To allow further understanding towards the purpose and effects of the invention, the invention has been particularly shown and described with reference to the preferred embodiments and the accompanying drawings, wherein:

DETAILED DESCRIPTION OF PREFERRED EMBODIMENTS

Figure 1:
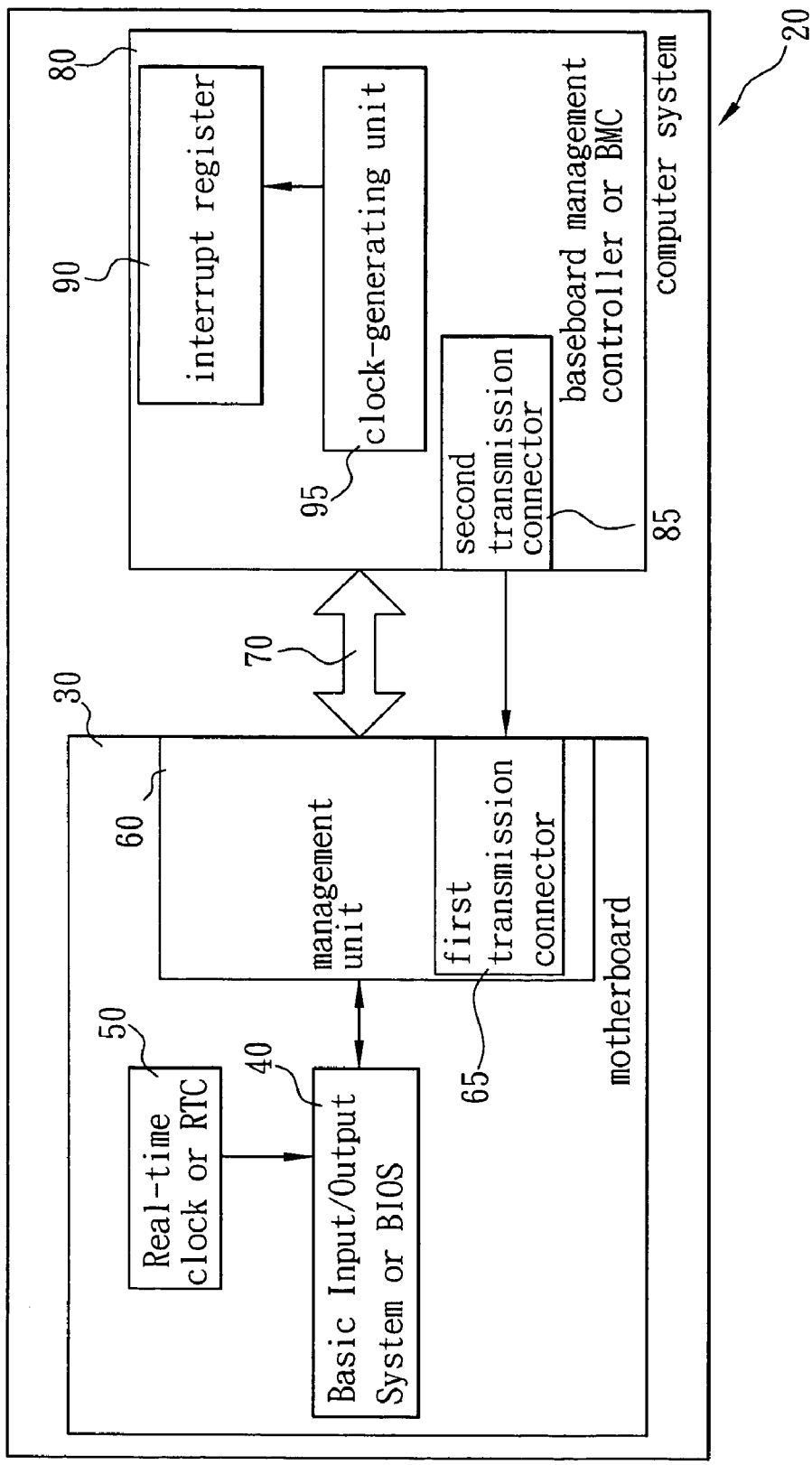
FIG. 1 shows the connection between a motherboard and a BMC according to the invention.
Figure 2:
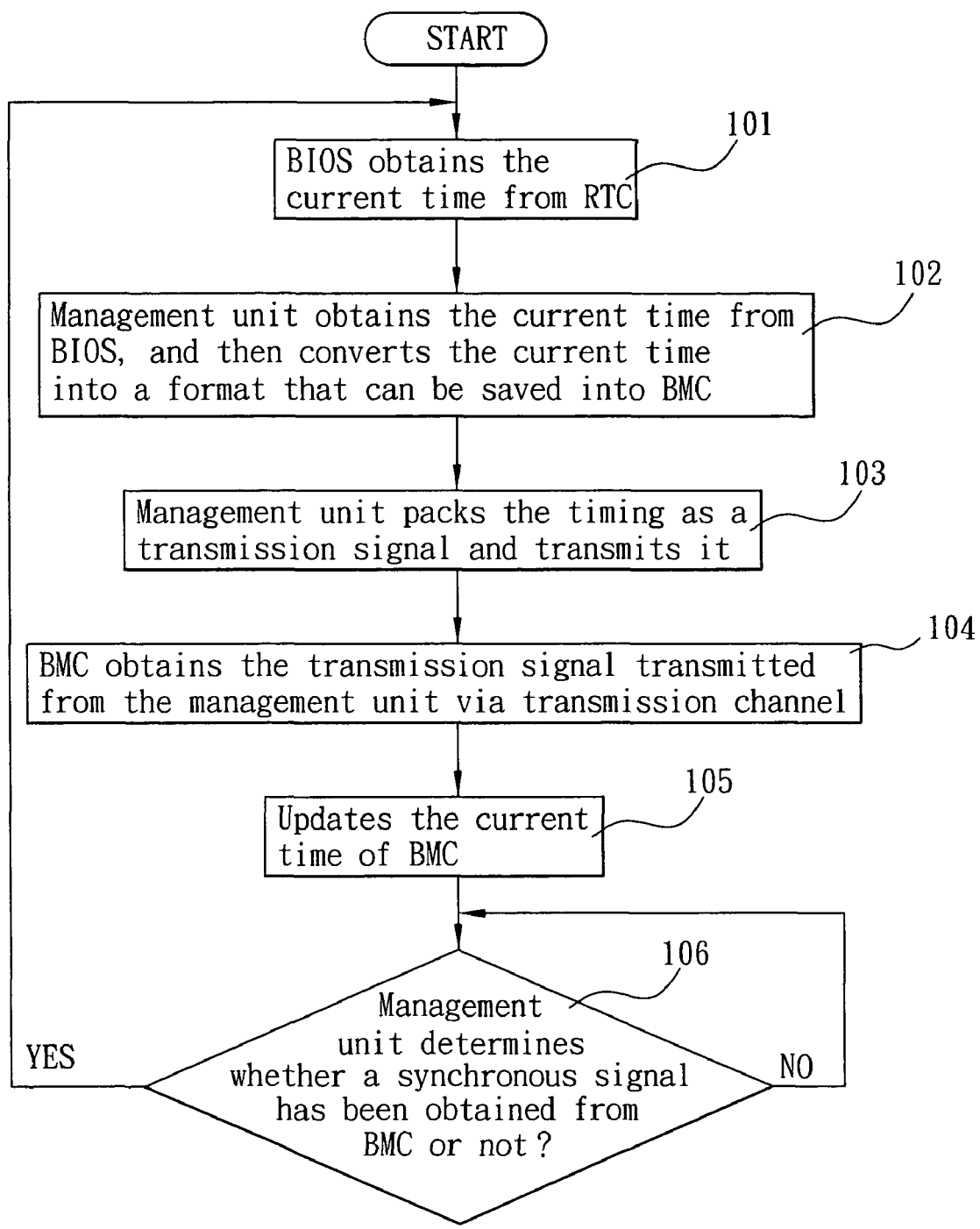
FIG. 2 is a flow chart that shows a method according to the invention.

The invention discloses a method for updating the timing of a BMC. As indicated in FIG. 1, this method is applied in a computer system 20, which comprises a motherboard 30, and a BMC 80 that is electrically connected to the motherboard 30. The BMC 80 obtains a current time from the motherboard 30 and updates the timing recorded in BMC 80 at regular intervals. As a result, the computer system 20 simultaneously updates the timing of BMC 80 and the current time of motherboard 30 every time it configures its time, thus ensuring the time of BMC 80 is maintained accurately without the need for system administrators to update the time manually. According to the invention, the computer system 20 updates time by the method indicated in FIG. 2:

(101) The BIOS hereafter of the motherboard 30 obtains a current time from a real-time clock 50 (abbreviated as RTC hereafter) of the motherboard 30 (for example, 00 hour 00 minute 00 second, $1^{st}$ of Jan., 1970 A.D.);

(102) A management unit 60 (for example, an Intelligent Platform Management Interface, or IPMI) of the motherboard 30 obtains the current time from the BIOS 40, and then converts the current time into a timing (for instance, 0x00000000) that can be saved into BMC 80 according to a timestamp format disposed in the management unit 60;

(103) The management unit 60 packs the timing as a transmission signal (for example, IPMI MESSAGE), and subsequently transmits the transmission signal through a transmission channel 70 (for instance, the Keyboard Controller Style Interface, or KCS Interface, of the system bus disposed on the motherboard) that connect the motherboard 30 and the BMC 80;

(104) The BMC 80 obtains the transmission signal transmitted from the management unit 60 and through the transmission channel 70;

(105) The BMC 80 obtains the timing from reading the transmission signal, and uses this timing to update the current timing of the BMC 80; and (106) The management unit 60 determines whether a synchronous signal has been obtained from the BMC 80 or not; if it has, the process is continued from step (101); if it has not, step (106) is repeated.

In an embodiment of the invention, as indicated in FIG. 1; a pin for a first transmission connector 65 (for instance, the General Purpose Input Output, or GPIO) is disposed in the management unit 60, and a second transmission connector 85 (for example, the GPIO PIN) that matches the first transmission connector 65 is disposed in the BMC 80; the first transmission connector 65 is electrically connected to the second transmission connector 85. By detecting the change of voltage at the first transmission connector 65, the management unit 60 can determine the change of voltage (for example, change between low voltage and high voltage) transmitted from the second transmission connector 85 in the BMC 80. These changes can be used as the events for determining different statuses or interrupts (such as System Management Interrupt, or SMI), and thus can be used as a binary on-off control. Therefore, in the aforesaid step (104), the management unit 60 determines whether the BMC 80 has transmitted a synchronous signal (such as a change from low voltage to high voltage, or a change from high voltage to low voltage) by the change of voltage transmitted from the second transmission connector 85 and received at the first transmission connector 65. In addition, the timestamp format can represent Greenwich Mean Time (GMT) from 00 hour 00 minute 00 second, $1^{st}$ of Jan., 1970 A.D. to 00 hour 00 minute 00 second, $1^{st}$ of Jan., 2100 A.D. in the form of 0x00000000 to 0x20000000, in order to facilitate the calculation of low level algorithms that take place inside of the BMC 80.

Figure 3:
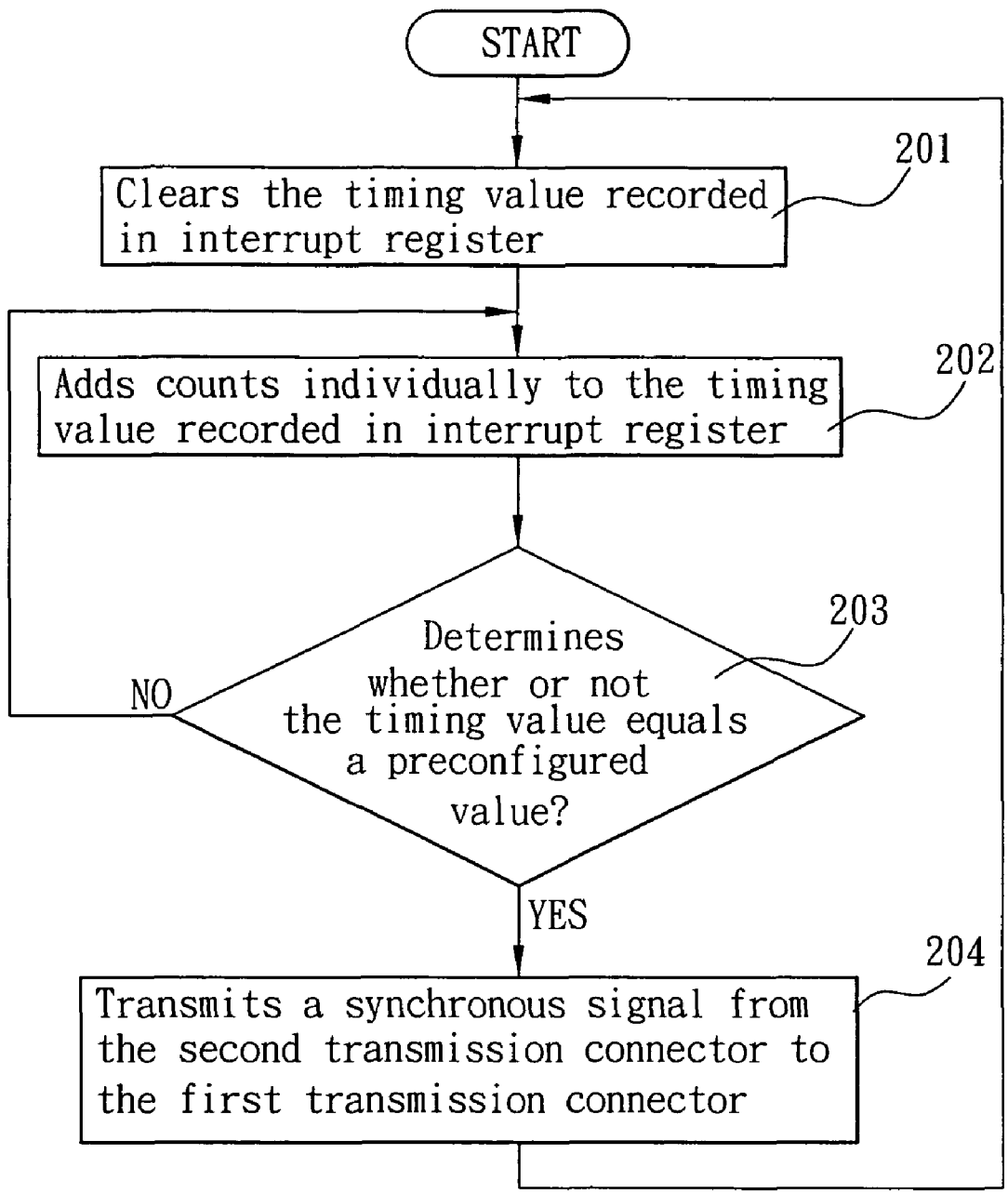
FIG. 3 shows the stepwise method for the BMC to transmit synchronous signals, according to the invention.

Referring to FIG. 1 and FIG. 3, after the timing of the BMC 80 in the computer system 20 has been updated, the step of generating a synchronous signal at the BMC 80 comprising:

(201) A timing value recorded in an interrupt register 90 of the BMC 80 is cleared (that is, the interrupt register 90 is initialized);

(202) Counts are added individually to the timing value recorded in the interrupt register 90 according to a clock signal generated from a clock-generating unit 95 of the BMC 80;

(203) Determining whether the timing value recorded in the interrupt register 90 equals to a configured time set by the users or the manufacturer (for instance, a configuration of 2 hours); if it does, the process is continued from step (204); if it does not, the step (202) is repeated.

(204) A synchronous signal is transmitted from the second transmission connector 85 of the BMC 80 to the first transmission connector 65, and then the process is repeated from step (201).

In accordance with the methods described above, every time the computer system 20 starts, the timing of BMC 80 is updated in the way described in step (101) to step (105), and the computer system 20 also automatically and repetitively updates the timing of BMC 80 at a regular interval, thereby making the timing of BMC 80 become more accurate, which effectively solves the problems resulted from the prior arts.

While the invention herein disclosed has been described by means of specific embodiments, numerous modifications and variations could be made thereto by those skilled in the art without departing from the scope and spirit of the invention set forth in the claims.

What is claimed is:

1. A method for updating time of a BMC (Baseboard Management Controller), which is applied to a computer system comprising a motherboard electrically connected to said BMC, wherein said motherboard includes at least a RTC (Real-Time Clock), a management unit and a transmission channel disposed between said motherboard and said BMC, so as to enable said computer system to execute the following steps each time said management unit determines that a synchronous signal is obtained from said BMC:

receiving a current time of said RTC by a BIOS (Basic Input/Output System) of said motherboard;

receiving said current time from said BIOS by said management unit, wherein said management unit converts said current time into an update time in a format acceptable to said BMC according to a timestamp format;

encapsulating said update time into a transmission signal and transmitting said transmission signal to said BMC by said management unit via said transmission channel;

receiving said transmission signal by said BMC; and interpreting said transmission signal by said BMC to obtain said update time, which is used to update a current time of said BMC, so as to enable said current time of said BMC to be identical to said current time of said RTC.

2. The method of claim 1, after said current time of said BMC is updated, further comprises the steps of:

clearing a period of time value recorded in an interrupt register of said BMC; saving a new period of time value to said interrupt register, wherein said new period of time value is counted and accumulated in accordance with a clock signal generated by a clock-generating unit in said BMC;

determining whether or not said new period of time value saved in said interrupt register equals to a predetermined period of time value; and transmitting said synchronous signal from a second transmission connector disposed in said BMC when said new period of time value equals to said predetermined period of time value, and enabling a first transmission connector disposed in said management unit to receive said synchronous signal.

3. The method of claim 2, wherein said management unit determines whether or not receiving said synchronous signal by detecting changes of voltage at said first transmission connector, and the changes of voltage includes a change from low voltage to high voltage or a change from high voltage to low voltage.

4. The method of claim 1, wherein said timestamp format is used to convert Greenwich Mean Time into a digital format acceptable to said BMC.

5. The method of claim 3, wherein said timestamp format is used to convert Greenwich Mean Time into a digital format acceptable to said BMC.

* * * * *